United States Patent [19]

Brooks

[11] Patent Number: 4,852,913
[45] Date of Patent: Aug. 1, 1989

[54] APPARATUS FOR REPAIRING PIPES

[76] Inventor: Albert J. Brooks, 4165 Emerick, Saginaw, Mich. 48603

[21] Appl. No.: 115,850

[22] Filed: Nov. 2, 1987

Related U.S. Application Data

[63] Continuation-in-part of Ser. No. 1,342, Jan. 8, 1987, abandoned.

[51] Int. Cl.4 .......................................... F16L 55/10
[52] U.S. Cl. ........................................ 285/15; 285/419; 285/424; 138/99
[58] Field of Search .................. 285/419, 373, 15, 424; 138/99

[56] References Cited

U.S. PATENT DOCUMENTS

| Re. 17,166 | 12/1928 | Mare | 138/99 X |
| 3,251,615 | 5/1966 | Short | 285/373 X |
| 4,142,743 | 3/1979 | McGowen et al. | 285/424 X |
| 4,664,428 | 5/1987 | Bridges | 285/373 |

FOREIGN PATENT DOCUMENTS

| 2308600 | 9/1973 | Fed. Rep. of Germany | 285/419 |
| 774641 | 12/1934 | France | 285/419 |

Primary Examiner—Dave W. Arola
Attorney, Agent, or Firm—Learman & McCulloch

[57] ABSTRACT

Apparatus for the in-situ repair of a pipe comprises a pair of trough-like units each of which has an arcuate wall and each of which is of such size that the two units may closely encircle the pipe. One unit has circumferentially spaced shoulders from which flanges diverge outwardly, and the other unit has free side edges that may be accommodated between the flanges in confronting relation with the shoulders. Clamps may be applied to the assembled units to maintain them in encircling relation with the pipe, the shoulders preventing the application of crushing force on the pipe.

20 Claims, 2 Drawing Sheets

APPARATUS FOR REPAIRING PIPES

RELATED APPLICATION

This application is a continuation-in-part of application Ser. No. 07/001,342 filed Jan. 8, 1987, now abandoned.

BACKGROUND OF THE INVENTION

This invention relates to apparatus for the in-situ repair of pipes such as automotive engine exhaust pipes.

Internal combustion engines conventionally are equipped with exhaust manifolds coupled by pipes to catalytic converters, mufflers, and resonators. It is not uncommon for such exhaust pipes to become ruptured due to oxidation, vibration, being struck by stones, or in other ways.

When an exhaust pipe ruptures or becomes disconnected from a muffler, another pipe, a resonator, or the like, it is conventional practice to replace the entire pipe at sometimes considerable expense. Particularly is this true in those instances in which special tools are required to remove and replace retainers, clamps, and the like.

In many instances a pipe may have a rupture caused by stone damage, in which case the damage is confined to a localized area and the remainder of the pipe is sound. In other instances a pipe may be perforated due to corrosion, again in a localized zone, whereas the remainder of the pipe is sound. In still other instances a joint between two pipe sections may have deteriorated due to the reaction between the materials forming the two different sections, whereas those portions of the pipe sections on opposite sides of the joint remain in good condition.

In all of the circumstances referred to above the repair of the pipe or pipes can be effected quite simply and inexpensively by encircling the damaged zone with a relatively short tube which can be clamped onto the pipe, thereby dispensing with the need for replacing one or more whole pipe sections.

An object of the present invention is to provide apparatus of simple, inexpensive construction that is adapted to be applied to an exhaust or other pipe having a rupture or other fault therein and which is effective to seal the fault and restore the pipe to sound condition.

SUMMARY OF THE INVENTION

Apparatus constructed in accordance with the invention comprises a pair of separate, elongate, trough-like units each of which partially may encircle the pipe. The size and configuration of the two units are such that, when assembled, they fully encircle the pipe. A first one of the units has an arcuate wall the circumferential length of which is greater than 180°. This wall is offset adjacent its opposite side edges to form shoulders from which flanges diverge. The other or second one of the units has a wall which is arcuate, but not semicircular, and terminates in opposite side edges having a chordal distance between them that is greater than the chordal distance between the shoulders of the first unit, but less than the chordal distance between the free edges of the flanges of such first unit. Because the chordal distance between the free edges of the second unit is less than that between the free edges of the flanges of the first unit, the second unit may be assembled with the first unit so that the free edges of the second unit are embraced by the flanges and confront the shoulders of the first unit, thereby enabling the two units to form a tubular assembly encircling the pipe and extending beyond both sides of the rupture.

Clamps may be applied to the tubular assembly to secure it in tightly encircling relation about the pipe. The free edges of the second unit thus may seat upon the shoulders of the first unit and prevent radially compressive movement of the two units to such an extent as to crush the pipe which they encircle.

THE DRAWINGS

Preferred embodiments of the invention are disclosed in the following description and in the accompanying drawings, wherein.

Figure 6:
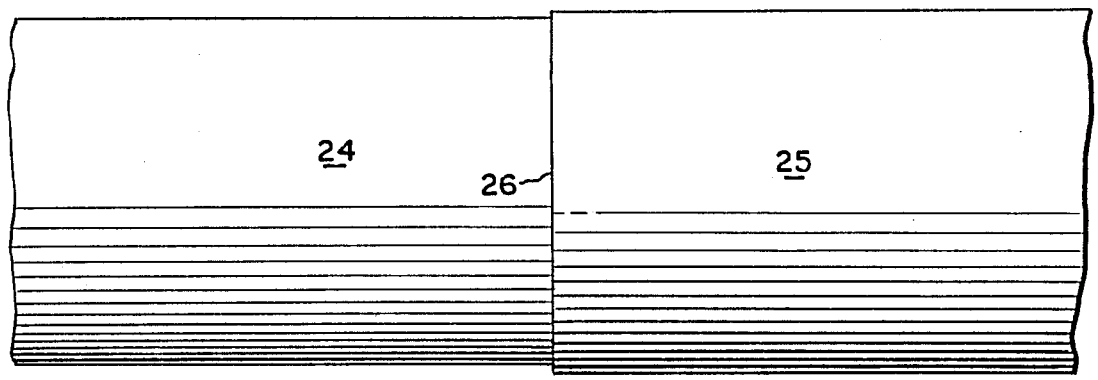
Figure 7:
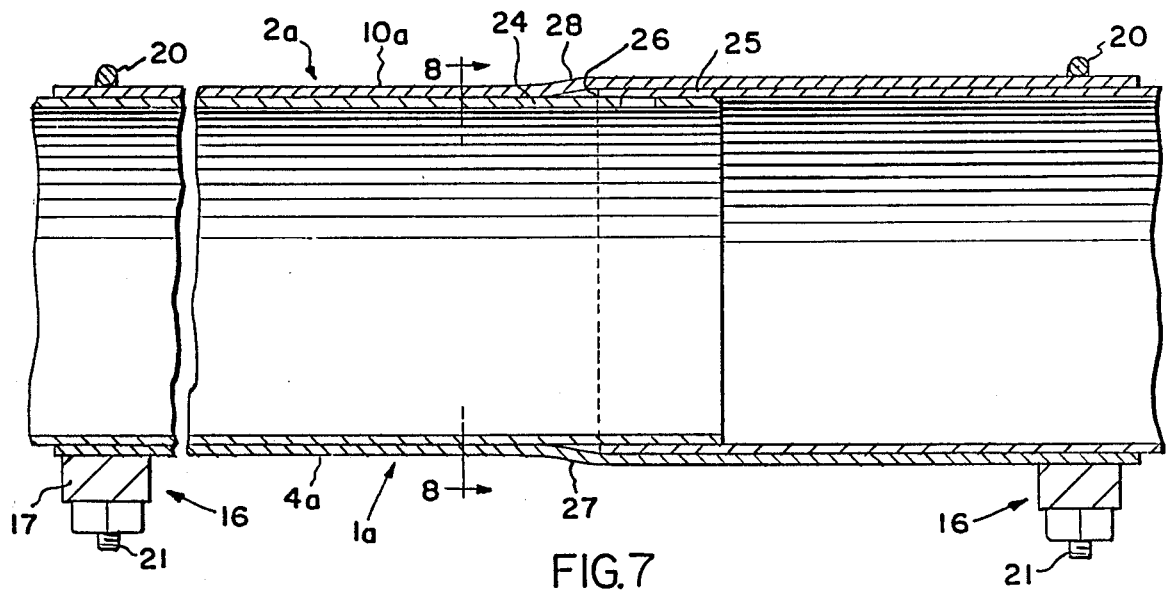
Figure 8:
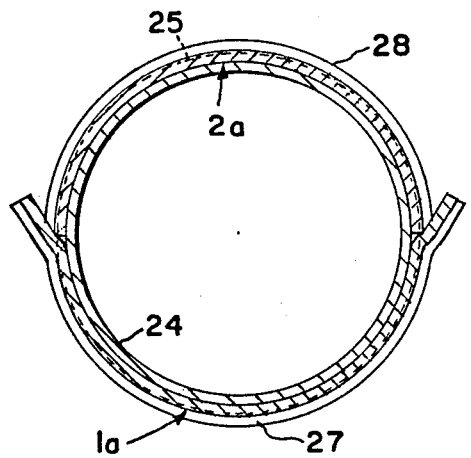

FIG. 6 a fragmentary, side elevational view of two cylindrical pipe sections joined to one another in telescoped relation;

FIG. 7 is a vertical sectional view illustrating a pair of assembled, modified repair units clamped in encircling relation about the two pipe sections shown in FIG. 6; and FIG. 8 is a vertical sectional view of the repair units shown in FIG. 7.

DETAILED DESCRIPTION

Repair apparatus constructed in accordance with the embodiment of the invention disclosed in FIGS. 1–5 comprises a pair of trough-like units 1 and 2 which are adapted to be placed in encircling relation about an engine exhaust pipe 3. The unit 1 has an imperforate, arcuate wall 4 terminating at its opposite sides in smooth surface flanges 5 and 6 which are substantially planar, rather than curvilinear. At the juncture of each flange with the arcuate wall 4 is a shoulder 7 formed by laterally offsetting or displacing the material from which the unit is formed. The extent of offset preferably is no greater than the thickness of the wall 4. The configuration of the wall 4 from shoulder to shoulder is semicircular and about 180° in circumferential length. The flanges 5 and 6, however, extend beyond the shoulders and flare or diverge outwardly at an angle of between about 20° and 30° to the vertical. The shoulders 7 and the free edges of the flanges 5 and 6, respectively, are coplanar.

The unit 2 also has an imperforate, arcuate wall 10 terminating in opposite sides 11 and 12. Although the wall 10 is curvilinear, it preferably is formed on a radius that is larger than that on which the wall 4 is formed. The difference in radius may result from a die forming operation which enables the unit 2 to expand following deformation of a flat sheet due to the resilience or springiness of the material from which the unit 2 is formed. Thus, in the radially unstressed condition of the unit 2 the wall 10 is less than 180° in circumferential length, and the chordal distance A between the side edges 11 and 12 of the wall 10 is greater than the chordal distance B between the shoulders 7 of unit 1, but, as is shown in FIG. 2, the distance A is less than the chordal distance between the free edges 8 and 9 of the flanges 5 and 6.

The exhaust pipe 3 shown in FIGS. 2-5 has a circular wall 13 which, at the time of manufacture, was imperforate and of substantially uniform diameter, but which has been indented as at 14 and ruptured as at 15.

Figure 1:
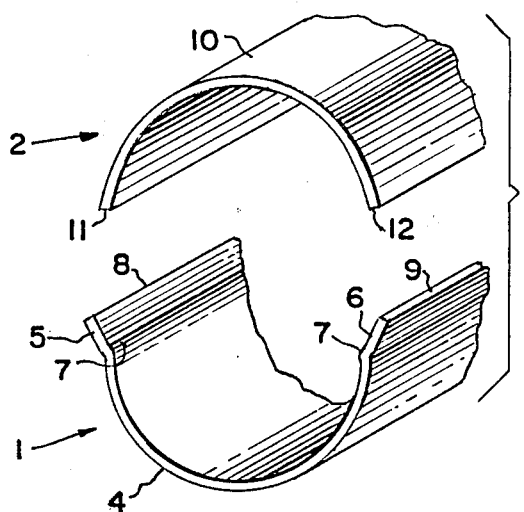
FIG. 1 is a fragmentary, isometric view illustrating two separated repair units prior to their assembly in encircling relation about a pipe.
Figure 2:
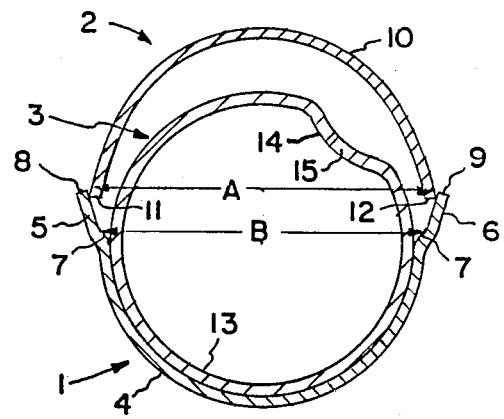
FIG. 2 is a transverse sectional view through the two units illustrating an initial stage in their assembly with a dented and ruptured pipe.
Figure 3:
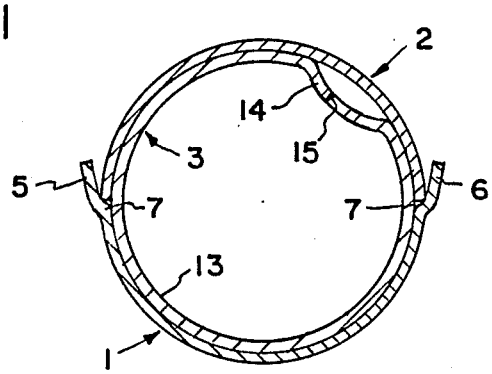
FIG. 3 is a view similar to FIG. 2, but illustrating the two repair units in their final positions of assembly with the pipe.
Figure 4:
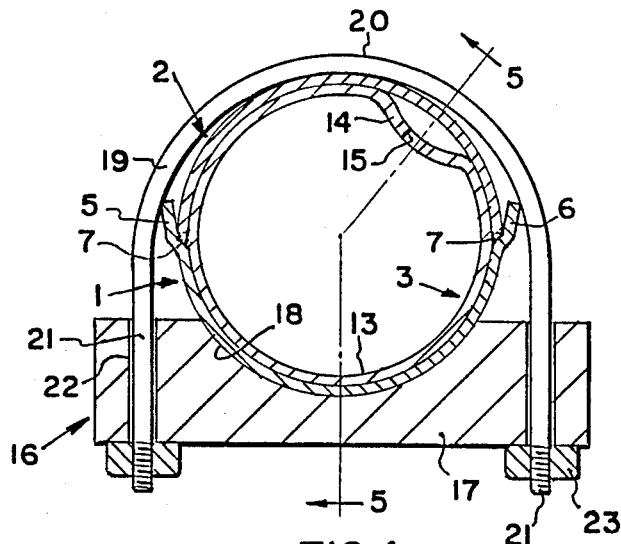
FIG. 4 is a view similar to FIG. 3, but illustrating the application of a clamp to one end of the assembled repair units.
Figure 5:
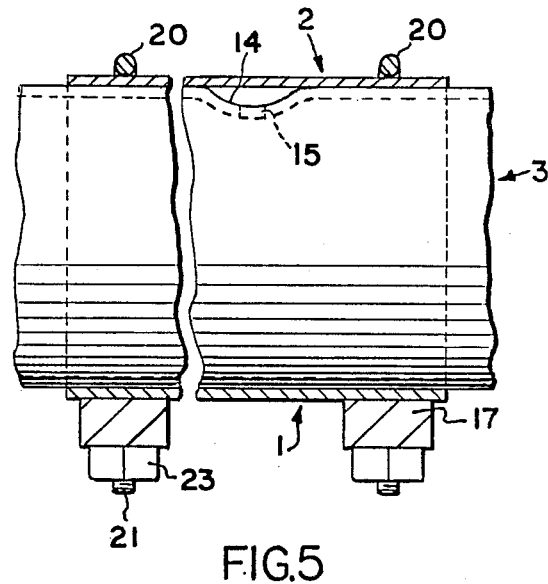
FIG. 5 is a fragmentary, sectional view taken on the line 5—5 of FIG. 4.

To repair the pipe 3, the units 1 and 2 are arranged in the manner indicated in FIG. 2 so that the unit 1 underlies and partially encircles the pipe 3 and the unit 2 overlies the pipe 3 and the unit 1. Due to the difference in radii of the respective walls 4 and 10, movement of the unit 2 directly toward the unit 1 will enable the free edges 11 and 12 of the wall 10 to engage the flanges 5 and 6 at a level between the shoulders 7 and the free edges 8 and 9. The unit 2 then may be moved further in a direction toward the unit 1 whereupon the free edges 11 and 12 will slide downwardly along the respective flanges 5 and 6 until such free ends seat on the shoulders 7. During such movement of the member 2 the wall 10 thereof will be flexed radially inwardly, thereby resulting in the free ends 11 and 12 engaging the inner surfaces of the flanges 5 and 6 with sufficient frictional force to maintain the units 1 and 2 in assembled relation encircling the pipe 3 and overlying the rupture 15.

Clamps preferably are applied to the assembled units 1 and 2 to maintain them in assembled relation with the pipe 3. Although different kinds of clamps may be used, a suitable clamp 16 comprises a block 17 having a recess 18 in which the unit 1 is partially accommodated and a U-bolt 19 having a bight 20 engaging the wall 10 of the unit 2. The bolt 19 has threaded ends 21 extending through openings 22 in the block 17 for accommodation in threaded nuts 23. The clamps 16 positively preclude inadvertent separation of the units 1 and 2, and the seating of the free ends 11 and 12 of the unit 2 on the shoulders 7 of the unit 1 prevents movement of the ends 11 and 12 past the shoulders, thereby precluding radial contraction of the units 1 and 2 by such an amount as to crush the pipe 3.

The material from which the units 1 and 2 is made preferably is one that is springy and heat resistant and will oxidize relatively quickly in response to repetitive heating and cooling such as is encountered when an engine to which the exhaust pipe 3 is connected is operated periodically. One such material is about 16 guage, untreated, cold rolled steel.

In the embodiment shown in FIGS. 6-8, two pipe sections 24 and 25 of different diameters are joined together with the end of the smaller diameter section being telescoped into the end of the larger diameter section. In the event one of the pipe sections 24 or 25 ruptures near the joint 26 between the two sections, or if the joint itself should deteriorate, it may be necessary to apply repair apparatus in accordance with the invention in such manner as to bridge the joint. Such a repair device may comprise a unit 1a and a unit 2a, the units 1a and 2a being exactly like the units 1 and 2, respectively, except that one end of each unit 1a and 2a is formed on an arc or radius that is less than that on which the other end of the respective units 1a and 2a is formed. This provides a smoothly tapered neck or throat 27 between the ends of the unit 1a and a similar neck or throat 28 between the ends of the unit 2a. The axial length of the necks 27 and 28 and the difference in the degree of taper are such as to enable the necks to provide a smooth transition at the zone where the units 1a and 2a bridge the joint. The longitudinal free edges of each of the respective units 1a and 2a are coplaner.

The assembly of the units 1a and 2a with the pipe sections 23 and 24 is the same as that which has been described in connection with the application of the units 1 and 2 to the pipe 3, except that care should be taken to ensure that the necks 27 and 28 are located at the joint 26 between the pipe sections 23 and 24. The length of the units 1a and 2a should be sufficient not only to span a rupture in one of the pipe sections 23 and 24, but also to provide support for such pipe sections in the event the joint itself is broken or ruptured.

Clamps like the clamp 16, or other suitable clamps, may be used to secure the units 1a and 2a in close fitting and circling relation about the pipe sections 24 and 25.

The application of the repair apparatus to an exhaust or other pipe will enable a rupture or other relatively small flaw to be repaired quite effectively, as well as simply and inexpensively. In most instances the repair can be effected by persons who have no technical training or experience.

Companion repair units may be manufactured in different lengths and radii so as to provide a stock of units for use with different size pipes.

The disclosed embodiments are representative of presently preferred forms of the invention, but are intended to be illustrative rather than definitive thereof. The invention is defined in the claims.

I claim:

1. Apparatus for encircling application to a pipe comprising a pair of separate, elongate, trough-like units each of which has an imperforate wall of such size and configuration as partially to encircle said pipe, one of said units having its wall offset at spaced zones to form spaced shoulders from which extend flanges having free edges, the other of said units having opposite side edges spaced from one another a distance enabling them to be accommodated between said flanges of said one of said units and seated upon said shoulders, said units together forming a tubular assembly of such size as closely to encircle said pipe; and clamp means for maintaining said units in assembled relation about said pipe, said shoulders and the side edges of said other of said units being so configured that the seating of said side edges of said other of said units on said shoulders prevents movement of said side edges past said shoulders, thereby limiting the minimum transverse dimension of said tubular assembly.

2. Apparatus according to claim 1 wherein the wall of said one of said units is arcuate between said shoulders and the wall of the other of said units is arcuate between its opposite side edges.

3. Apparatus according to claim 2 wherein said flanges are substantially planar.

4. Apparatus according to claim 3 wherein the chordal distance between the side edges of said other of said units is less than the chordal distance between the free edges of said flanges.

5. Apparatus according to claim 4 wherein the chordal distance between the side edges of said other of said units prior to assembly of said units is greater than the chordal distance between said shoulders.

6. Apparatus according to claim 1 wherein said flanges diverge in a direction away from said shoulders.

7. Apparatus according to claim 1 wherein each of said units is formed of springy material enabling the wall thereof to flex.

8. Apparatus according to claim 1 wherein the transverse dimension of each of said units is substantially uniform from end to end.

9. Apparatus according to claim 1 wherein the transverse dimension of each of said units is greater at one end thereof than at the opposite end thereof.

10. Apparatus according to claim 9 wherein the side edges of each of said units are coplaner.

11. Apparatus according to claim 9 wherein said shoulders are coplanar.

12. Apparatus according to claim 1 wherein each of said units is formed from a material that is fusible to the material of the other.

13. Apparatus for encircling application to a pipe comprising a pair of separate, elongate units each of which has an arcuate wall of such curvature as to correspond substantially to that of said pipe and of such circumferential length as together to encircle said pipe, the wall of one of said units being of greater circumferential length than the wall of the other of said units, said wall of said one of said units being offset transversely at circumferentially spaced zones to form circumferentially spaced shoulders, those portions of the wall of said one of said units between said shoulders and the respective opposite side edges forming flanges, the circumferential length and curvature of the wall of the other of said units being sufficient when said units are assembled in encircling relation about said pipe to enable the opposite side edges of the wall of said other of said units to frictionally bear against said flanges and seat on said shoulders and the portions of the wall of said other of said units underlying said flanges conforming to the curvature of said pipe, said shoulders and the side edges of said other of said units being so configured that the seating of said side edges of said other of said units on said shoulders prevents movement of said side edges past said shoulders, thereby limiting the minimum transverse dimension of said tubular assembly.

14. Apparatus according to claim 13 including clamp means for maintaining said units in encircling relation about said pipe.

15. Apparatus according to claim 13 wherein said flanges are substantially planar.

16. Apparatus according to claim 13 wherein said flanges diverge in a direction away from said shoulders.

17. Apparatus according to claim 13 wherein the chordal distance between the opposite side edges of the wall of said other of said units is less than the chordal distance between the free edges of said flanges and greater than the chordal distance between said shoulders prior to assembly of said units.

18. Apparatus according to claim 17 wherein said other of said units is formed of springy material enabling its wall to flex.

19. Apparatus according to claim 13 wherein the transverse dimension of each of said units is greater at one end thereof than at the opposite end thereof and wherein each of said units has a tapered neck between its ends.

20. Apparatus according to claim 19 wherein the side edges of each of said units are coplanar.

* * * * *